United States Patent [19]
Nakamura et al.

[11] 3,846,811
[45] Nov. 5, 1974

[54] FLASH UNIT FOR USE WITH CAMERA

[75] Inventors: Zenzo Nakamura, Urawa; Takashi Uchiyama, Yokohama; Tetsuya Taguchi, Kawasaki; Yukio Mashimo, Tokyo, all of Japan

[73] Assignee: Canon Kabushiki Kaisha, Tokyo, Japan

[22] Filed: Mar. 26, 1973

[21] Appl. No.: 344,467

[30] Foreign Application Priority Data
Mar. 29, 1972 Japan.............................. 47-31343
Apr. 20, 1972 Japan.............................. 47-39957

[52] U.S. Cl................. 354/145, 354/33, 315/150, 315/158
[51] Int. Cl. ........................................... H05b 41/38
[58] Field of Search............. 95/10 CE, 11 L, 11.5; 315/150, 158; 354/27, 33, 145

[56] References Cited
UNITED STATES PATENTS
3,591,829 7/1971 Murata et al..................... 95/10 CE
3,727,100 4/1973 Kuraisni et al................... 95/11.5 R

*Primary Examiner*—Samuel S. Matthews
*Assistant Examiner*—R. E. Adams, Jr.
*Attorney, Agent, or Firm*—Flynn & Frishauf

[57] ABSTRACT

A flash unit for use with a camera includes a DC power supply and a flash lamp or lamps between which a constant current circuit is inserted to maintain the intensity of flash of light produced by the flash lamp or lamps at a constant level for a predetermined time duration. A Darlington circuit having its base current controlled by an FET provides a constant current circuit in which a variable resistor between the source electrode of the FET and the connection between the FET gate and the Darlington circuit control electrode enables the constant current value to be adjusted.

14 Claims, 11 Drawing Figures

FLASH UNIT FOR USE WITH CAMERA

BACKGROUND OF THE INVENTION

1. Field of the Invention

The present invention relates to a flash unit or use with a camera of the type capable of maintaining the intensity of flash of light produced by a flash lamp at a constant level by maintaining the current flowing through the flash lamp at a constant level.

2. Description of the Prior Art

In the conventional circuit for triggering a flash lamp for producing flash of light for illuminating a subject for photographing the voltage supplied from a low voltage supply such as a battery is stepped up by a DC converter in order to charge a main flash capacitor having a large capacitance and an auxiliary or trigger capacitor for applying the trigger voltage to the trigger electrode of the capacitor. When the gas filling in the flash lamp is ionized by the triggering voltage, the voltage across the main flash lamp is instantaneously applied to the flash lamp so that the maximum current reaches the order of hundreds amperes and the characteristic curve of the intensity of flash becomes similar to the triggering voltage characteristic curve as shown by the curve A in FIG. 1. Therefore the prior art flash unit has a distinct defect that flash duration is extremely short. Furthermore the prior art flash unit also has the disadvantage that rapidity of succession of flashes is limited because it takes some time to recharge the main flash capacitor.

The conventional flash unit has a further defect that its flash efficiency is low because the large current flows through the flash lamp instantaneously. That is, the discharge current flows through the flash lamp as indicated by the curve a in FIG. 1, but the ratio of the discharge current to the energy converted into a flash of light is very low. As a result, the time interval during which flash continues to be referred to as "the flash duration" in this specification is of the order of tens of micro seconds even though the discharge current flows through the flash lamp much longer. The reason is that since the large current is instantaneously applied, a substantial portion thereof is converted into heat while only a small portion is converted into light. In addition to the defect of the short flash duration of the prior art flash units, they have a still further defect that the intensity of flash is not constant with time.

In the flash lamp circuit comprising a main flash capacitor for storing the energy which is to be converted by a flash lamp connected in parallel with the main flash capacitor into light, the intensity of flash is not constant because the voltage across the main flash capacitor is decreased by discharging, and the flash duration is short because the voltage across the main flash capacitor is discharged instantaneously. In order to increase the flash duration, there has been proposed a method in which a discharge current limiting means such as a resistor, a coil or the like is inserted into the discharge circuit for the main flash capacitor, but by such means the problem that the intensity of flash cannot be maintained constant cannot be solved at all. Furthermore the discharge current limiting means causes energy loss particulary if a resistor is used therefor. The variation in intensity of flash of light produced by the flash lamp may be overcome when a power supply whose electromotive force may be maintained constant when the flash lamp flashes is used, but such a power supply is not available. Because of the reasons described above the flash duration of the conventional flash units is extremely short and the intensity of flash of light is not constant with time, so that when the conventional flash unit is used with a camera having a focal plane shutter for flash photography in the day time at a high shutter speed, the exposure of the film is not uniform. Furthermore it is difficult to control a stroboscopic unit of the type controlling the flash duration or intensity of flash of light in response to the light reflected back from the subject which is measured by a flashmeter because the flash duration is short and the intensity of flash is extremely high.

SUMMARY OF THE INVENTION

One of the objects of the present invention is therefore to provide a flash unit for use with a camera capable of maintaining the intensity of flash of light produced by a flash lamp or lamps at a constant level for a relatively long time, thereby eliminating the defects encountered in the prior art flash units.

Another object of the present invention is to provide a flash unit of the type incorporating therein a constant current circuit interconnected between a flash lamp and a power supply so that the intensity of flash of light produced by the flash lamp may be maintained at a constant level for a predetermined time.

Another object of the present invention is to provide a flash unit capable of maintaining the intensity of flash of light produced by a plurality of series-connected flash lamps at a constant level for a relatively long time.

Still another object of the present invention is to provide a flash unit wherein a plurality of series-connected flash lamps are connected in series to a power supply, and a thyristor is inserted in a flash lamp circuit in such a manner that prior to flashing of the flash lamps at least one flash lamp is triggered to be flashed and all of the flash lamps flash simultaneously when the trigger voltage or pulse is applied thereto. The flash trigger signal and flash interruption signal are alternately applied to the gate of the thyristor so that the flashes may be cycled at a high frequency.

The above and other objects, features and advantages of the present invention will become more apparent from the following description of the preferred embodiments thereof taken in conjunction with the accompanying drawing.

DESCRIPTION OF THE PREFERRED EMBODIMENTS

Figure 1:
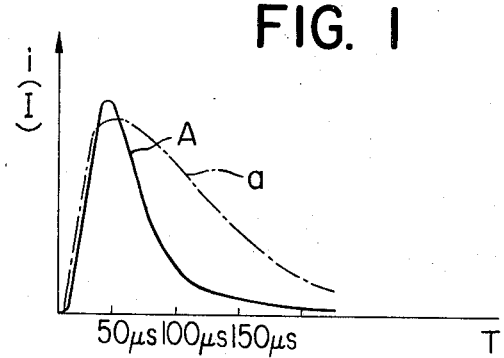
FIG. 1 is a graph used for the explanation of the flash characteristics of a prior art flash unit.
Figure 2:
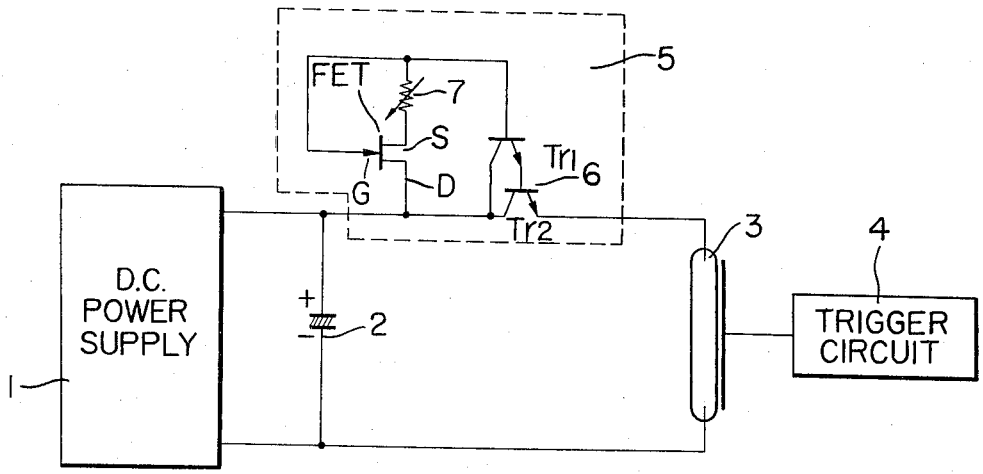
FIG. 2 is a circuit diagram of a first embodiment of a flash unit in accordance with the present invention.
Figure 3:
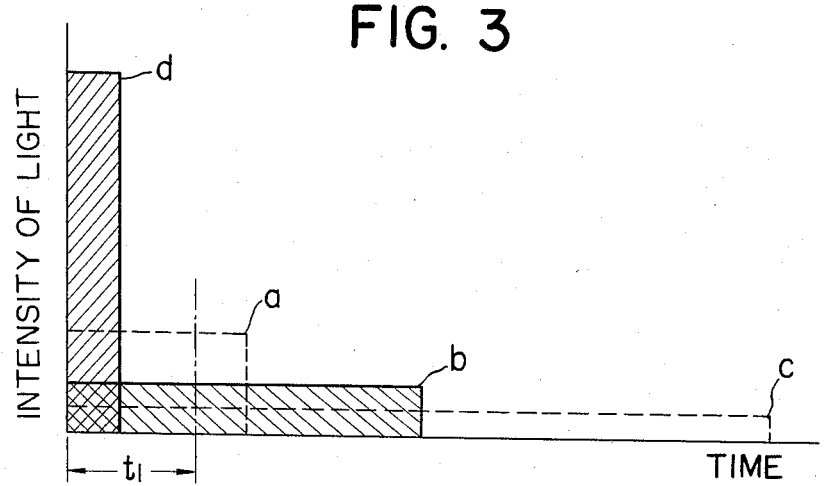
FIG. 3 is a graph used for the explanation of operation of the unit as shown in FIG. 2.

First Embodiment, FIGS. 2 and 3

Referring FIG. 2, the electric circuit of a first embodiment of a flash unit in accordance with the present invention comprises a DC power supply 1, a main flash capacitor 2 which stores the energy that is to be converted by a xenon-lamp 3 into light, a trigger circuit 4 comprising a conventional synchronous contact or trigger capacitor operatively coupled to a shutter mechanism of a camera, and a constant current circuit 5 connected to a discharge circuit for the main flash capacitor 2 so that the discharge current of the main flash capacitor 2 may be maintained constant.

The constant current circuit 5 comprises a field-effect transistor or FET having the source electrode S and the gate electrode G connected to each other and the drain electrode D connected to the discharge circuit of the main flash capacitor 2 and a Darlington circuit 6 comprising transistors $Tr_1$ and $Tr_2$ to which is applied the output current of the field-effect transistor FET. The collector of the transistor $Tr_2$ in the output stage of the Darlington circuit 6 is connected to the main flash capacitor and the emitter is connected to the flash lamp 3.

Next the mode of operation of the constant current circuit 5 will be described. Since the source electrode S and the gate electrode G are interconnected, the constant current flows from the drain electrode D to the source electrode S. The constant current is applied as the input current to the Darlington circuit 6 so that the constant current flows between the collector and emitter of the transistor $Tr_2$ in the output stage. The current flowing from the drain electrode D to the source electrode S of the field-effect transistor FET may be adjusted by a variable resistor 7 connected to the source electrode S. In other words by the variable resistor 7 the discharge current of the main flash capacitor 2 may be arbitarily adjusted. It is to be noted that the present invention is not limited only to the constant current circuit 5 of the type shown in FIG. 2, but a constant current circuit having an external power source may be used.

Next the mode of operation of the flash unit shown in FIG. 2 will be described with further reference to FIG. 3. In response to the synchronous signal generated by the camera the trigger circuit 4 is actuated so that a current starts to flow in the flash lamp 3. In FIG. 3, the intensity of flash light is plotted along the ordinate and the flash duration along the abscissa, and the flash light characteristic curves a, b and c are obtained by adjusting the variable resistor 7. When the energy stored by the main flash capacitor 2 is sufficient, the flash duration of a predetermined intensity of flash may be controlled by adjusting the discharge current of the main flash capacitor 2 by the variable resistor 7. Furthermore the intensity of flash may be also controlled with respect to the specified flash duration $t_1$. By the conventional flash unit neither the intensity of flash nor the flash duration can be adjusted as shown at d in FIG. 3.

In the first embodiment of the present invention described above, the flash duration may be adjusted while the intensity of flash is maintained constant, and the intensity of flash may be adjusted while the flash duration is maintained constant. As a result the flash duration may be varied by adjusting the constant current circuit 5 by the variable resistor 7 in response to a preset shutter speed of a focal-plane-shutter camera. A high shutter speed of, for example, 1/125 sec. must be used in the flash photography in the daytime, but when the intensity of flash is varied depending upon the width of the slit of the shutter, a uniform image cannot be obtained. However if the intensity of light is maintained constant when the shutter is opened a uniform image may be obtained. The flash unit shown in FIG. 2 may be also used for an automatic flash photography in which the intensity of flash must be varied depending upon the distance from the flash lamp to the subject. More particularly the shutter speed and aperture are maintained constant while the constant current circuit 5 is adjusted by the variable resistor 7 depending upon the distance to the subject so that the intensity of flash may be varied. In this case, it is preferable to set the information or the distance to the subject into the variable resistor 7 through a mechanism operatively coupled to a focusing ring of the camera.

Figure 4:
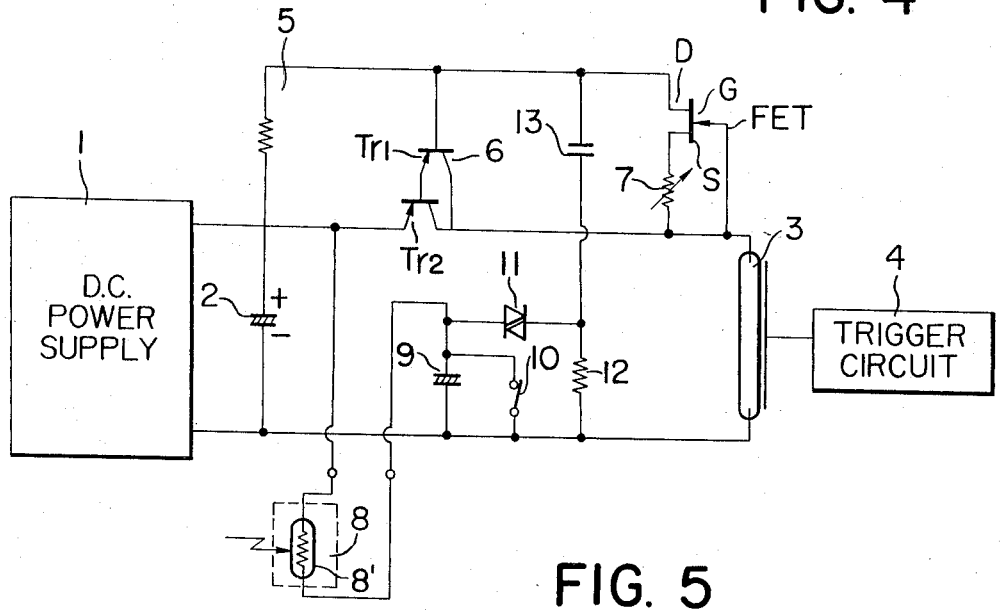
FIG. 4 is a circuit diagram of a second embodiment of the present invention.

Second Embodiment, FIG. 4

The second embodiment of a flash unit in accordance with the present invention shown in FIG. 4 is substantially similar in construction to the first embodiment shown in FIG. 2 except that the second embodiment is provided with a timer circuit based upon the principle of the present invention that the intensity of flash may be maintained constant for a relatively long time by the provision of the constant current circuit so that both of the adjustment of the flash duration and intensity of flash may be easily made. The timer circuit is connected in parallel with the main flash capacitor 2 and comprises a resistor 8 and a capacitor 9. A switch 10 for short-circuiting the capacitor 9 is normally closed but is adapted to be opened when the synchronous contact of the camera is closed. The discharge of the main flash capacitor 2 through the resistor 8 and the switch 10 when the latter is closed is made minimized so that this discharge will not adversely affect the triggering of the flash lamp 3. A bilateral element 11 is adapted to conduct when the voltage across the capacitor 9 in the timer circuit reaches a predetermined voltage level so that the capacitor 9 may be immediately discharged through a resistor 12 connected in parallel with the capacitor 9. The pulse voltage across the resistor 12 is applied through a capacitor 13 to the base of the transistor $Tr_1$ in the Darlington circuit so that both of the transistors $Tr_1$ and $Tr_2$ are cut off. As a result the discharge of the main flash capacitor 2 is stopped so that the flash lamp 3 is turned off. The variable resistor 7 connected to the source electrode S of the field-effect transistor in FIG. 4 is used only for adjustment in the assembly of the equipment and so that is not adjusted in response to the shutter speed or distance to the subject in contrast to the first embodiment shown in FIG. 2.

The intensity of flash produced by the flash unit may be maintained constant for a relatively long time, and the flash duration is controlled by the timer circuit. The flash unit of the second embodiment shown in FIG. 4 may be used as a flash unit with a flashlight meter when the resistor 8 in the timer circuit is a variable resistor which is adjusted automatically in response to the output of a flashlight meter adapted to intercept the light reflected from the subject in case of the flash photography or which is operatively coupled to the focusing ring of the camera. When the flash unit shown in FIG. 4 is used as a flash unit with a flashlight meter, the trigger circuit 4 is actuated upon the closure of the synchronous contact of the camera so that the flash lamp produces flash of a predetermined intensity. Simultaneously the switch 10 is opened so that the capacitor 9 is charged with a time constant which is dependent upon the resistance of the photo cell 8' or flashlight meter and the capacitor 9. When the capacitor 9 is fully charged the timer circuit is actuated in the manner described above. That is, when the voltage across the capacitor 9 reaches a predetermined value, that is when the exposure reaches a predetermined value, the capacitor 9 is discharged through the resistor 12 so that the discharge of the main flash capacitor 2 is stopped, thus resulting in turning off of the flash lamp 3.

According to the present invention the intensity of flash produced by the flash lamp 3 may be maintained at a constant level for a relatively long time so that the adjustment of the flash duration in response to the exposure factors may be easily made. It is preferable that the capacitance of the capacitor 9 in the timer circuit should be selected to be smaller as compared with the main flash capacitor 2 so that the capacitor 9 will not adversely affect the constant current circuit which assures that the flash lamp will be triggered and lighted at a constant current.

Figure 5:
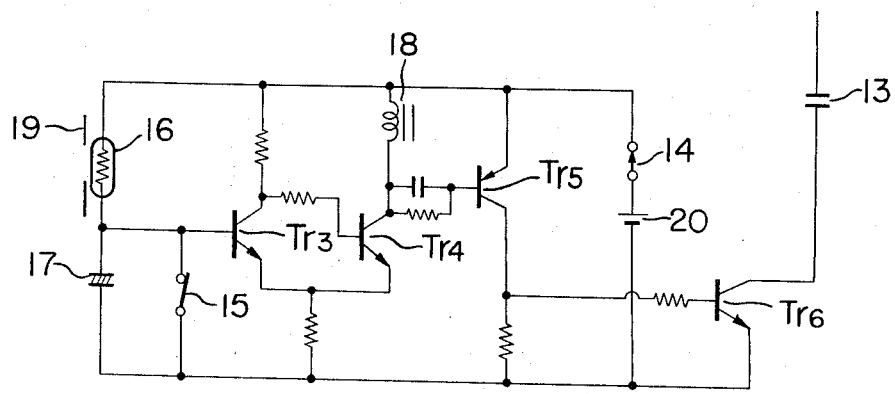
FIG. 5 is a circuit diagram of an electronic shutter used in conjunction with a flash unit in accordance with the present invention.

Electronic Shutter Circuit, FIG. 5

The flash unit shown in FIG. 4 may be coupled to an electronic shutter circuit shown in FIG. 5 instead of incorporating the timer circuit described above. In FIG. 5, one terminal of a capacitor 13 is connected to the base of the transistor $Tr_1$ shown in FIG. 4. The timer circuit comprising the capacitor 9, the switch 10, the element 11 and the resistor 12 in this case are disconnected or removed from the flash unit shown in FIG. 4. The electronic shutter circuit comprises an on-off switch 14, a normally closed switch 15 which is adapted to be opened in response to the shutter opening signal and to be closed when the film is advanced, a time constant circuit consisting of a photo cell 16 and a capacitor 17, the photo cell 16 being so located as to intercept the light from the subject; a Schmitt circuit consisting of transistor $Tr_3$ and $Tr_4$; an electromagnet 18 which is energized when the shutter is opened and is de-energized to close the shutter, an amplifier circuit consisting of transistors $Tr_5$ and $Tr_6$ for amplifying the output of the Schmitt circuit; and a power source 20. The collector of the transistor $Tr_6$ is connected to the other terminal of the capacitor 13.

The flash lamp 3 (See FIG. 4) is triggered by the trigger circuit 4 which in turn is actuated in synchronism with the opening of the switch 15, and if required the synchronous contact is used in the well known manner. The resistance of the photo cell 16 varies in response to the quantity of light impinging thereupon through a diaphragm device 19 which in turn is controlled depending upon the exposure factors such as a film sensitivity and an aperture.

Next the mode of operation will be described. Upon depression of the shutter button (not shown) of the camera, the on-off switch 14 is closed. When the shutter button is further depressed, the shutter is opened, and when the synchronous contact is closed at a time after the shutter has been opened but before the shutter is closed the trigger circuit 4 in FIG. 4 is actuated so that the flash lamp 3 flashes. When the shutter is opened the switch 15 is opened so that a timer circuit consisting of the photo cell 16 and the capacitor 17 is started. The light intercepted by the photo cell 16 is the light including light flashed by the flash lamp 3 and reflected by the subject. When the voltage across the capacitor 17 reaches a predetermined level the Schmitt circuit $Tr_3$ and $Tr_4$ is triggered so that the electromagnet 18 is de-energized. As a consequence the shutter closing device is released so that the shutter is closed. The output of the Schmitt circuit $Tr_3$ and $Tr_4$ is applied through the transistors $Tr_5$ and $Tr_6$ and the capacitor 13 to the transistor $Tr_1$ in the constant current circuit in the flash unit shown in FIG. 4. As a result the transistor $Tr_2$ is cut off so that the discharge of the main flash capacitor 2 is stopped and the flash lamp 3 is turned off.

Figure 6:
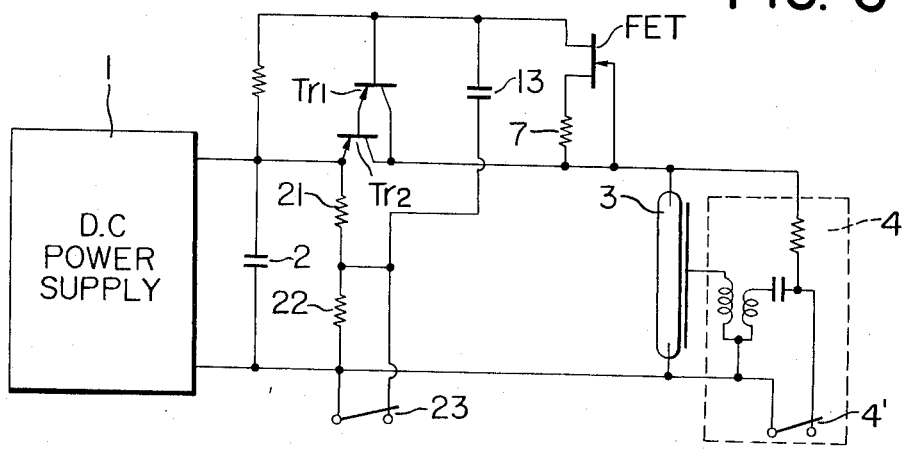
FIG. 6 is a circuit diagram of a variation of the flash unit shown in FIG. 4 used in conjunction with a mechanical timer.

Mechanical Timer, FIG. 6

Instead of the electronic timers shown in FIGS. 4 and 5, a flash unit in accordance with the present invention may use a mechanical timer as will be described hereinafter with reference to FIG. 6. A voltage divider consisting of resistors 20 and 21 is connected in parallel with the main flash capacitor 2 so that the voltage at the junction therebetween may be applied to the base of the transistor $Tr_1$ in the constant current circuit 5. A switch 23 which is connected in parallel with the resistor 22 is adapted to be opened and closed by a mechanical timer (not shown). The trigger circuit 4 includes a synchronous contact 4'.

Next the mode of operation will be described. When the mechanical timer stops its action, the switch 23 is closed so that the voltage across the resistor 22 is applied to the base of the transistor $Tr_1$ through the capacitor. As a result the flash lamp 3 is turned off in the manner described above.

Since a flash unit of the type shown in FIG. 6 can control the flash duration by the mechanical timer as described above, it may be used with a camera having a mechanical shutter. In this case, the switch 23 is so arranged as to be closed when the operation of the shutter closing means such as the second shutter blind has been completed or the switch 23 is operatively coupled to means for lowering a mirror in case of a single lens reflex camera.

Figure 7:
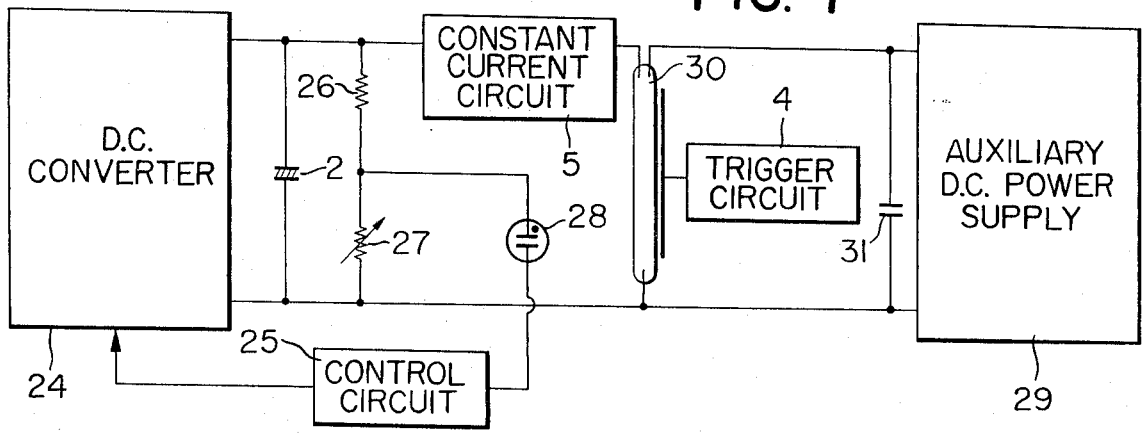
FIG. 7 is a circuit diagram of a third embodiment of the present invention.

Third Embodiment, FIG. 7

The third embodiment shown in FIG. 7 is also capable of varying the intensity of flash produced by a flash lamp under a constant current, and utilizes a constant current source in which the energy stored in the capacitor 2 is discharged to provide a constant current so that the flash may continue in excess of a preset shutter speed or exposure time.

In FIG. 7, to a DC converter 24 which is used as a high-voltage source is applied the output of a control circuit 25 to which is applied through a constant voltage discharge tube 28 the voltage at the junction between resistors 26 and 27 making up a voltage divider. Therefore the output voltage of the DC converter 24 may be controlled by the variable resistor 27 of the voltage divider. The output voltage of the DC converter 24 is applied across the main flash capacitor 2 so that the intensity of the flash produced by the flash lamp 30 may be varied.

The flash unit shown in FIG. 7 further comprises an auxiliary DC power supply 29 which is adapted to give the output voltage slightly higher than the minimum triggering voltage of the flash lamp 30 having three electrodes. The output voltage of the auxiliary DC power supply 29 is charged across an auxiliary capacitor 31 whose capacitance is very much smaller than that of the main flash capacitor 2.

When the voltage across the main flash capacitor 2 is less than that across the auxiliary capacitor 31, the voltage across the auxiliary capacitor 31 triggers the flash lamp 30 and then the flash lamp 30 continues to flash by a constant current supplied from the main flash capacitor 2. Therefore the energy or intensity of flash produced by the flash lamp 30 may be controlled by the variable resistor 27. When the voltage across the main flash capacitor 2 is higher than the minimum triggering voltage of the flash lamp 30, the flash lamp 30 flashes regardless of the voltage across the auxiliary capacitor 31. Instead of the flash lamp 30 having three electrodes, a flash lamp having two electrodes may be used.

Figure 8:
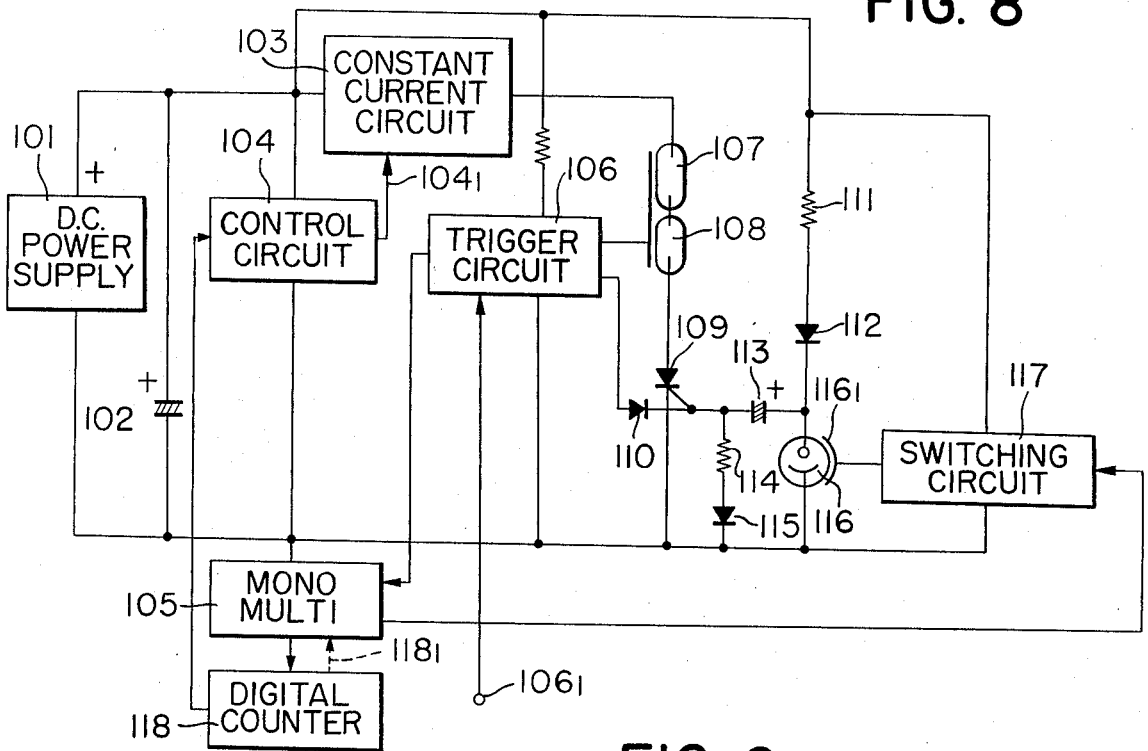
FIG. 8 is a circuit diagram of a fourth embodiment of the present invention.
Figure 9:
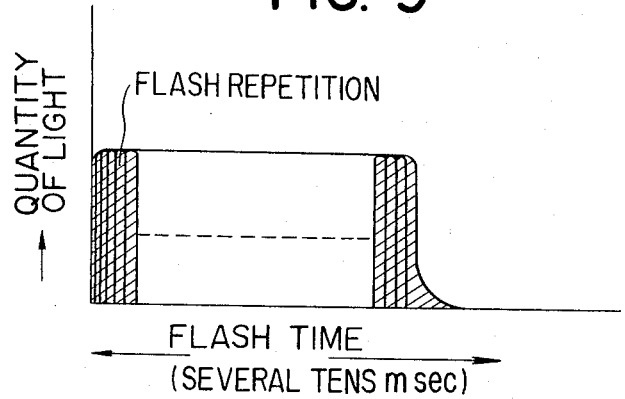
FIG. 9 is a graph illustrating the characteristics of the unit as shown in FIG. 8.

Fourth Embodiment, FIGS. 8 and 9

Referring to FIG. 8, the fourth embodiment of a flash unit in accordance with the present invention comprises a DC power supply such as a conventional DC converter 101, a main flash capacitor 102 connected in parallel with the DC power supply 101; a constant current circuit 103; a control circuit 104 whose output terminal is connected to the input of the constant current circuit 103 so that the output current of the constant current circuit 103 may be always maintained at a constant level in response to the voltage across the main flash capacitor 102 and the input from a monostable multivibrator 105; and a trigger circuit 106 comprising a conventional trigger pulse transformer which is used in the conventional flash unit. The trigger circuit 106 is actuated in response to the trigger input signal applied to an input terminal $106_1$ so that the trigger pulse appears at a trigger output terminal. The flash unit further comprises two series-connected xenon-filled discharge lamps or flash lamps 107 and 108 whose positive and negative electrodes are interconnected; a thyristor 109 whose gate is connected through a diode 110 to the trigger circuit 106; a series circuit consisting of a resistor 111, a diode 112, a resistor 114 and a diode 115 and connected in parallel with the main flash capacitor 102 for making up a charging circuit for a capacitor 113; a discharge lamp 116; a switching circuit 117 and a digital counter 118 for counting the output pulses of the multivibrator 105.

Next the mode of operation will be described. When the main flash capacitor 102 has been fully charged, the control circuit 104 controls the constant current circuit 103 so that the latter may pass a predetermined constant current which depends upon the voltage across the main flash capacitor 102. When the shutter of the camera is opened the synchronous signal is applied to the input terminal $106_1$ so that the trigger circuit 106 applies the pulse voltage to the trigger electrodes of the xenon lamps 107 and 108. Xenon gas within the lamp 108 is ionized as the trigger pulse is applied to the gate electrode thereof, and then the trigger pulse is applied to the gate of the thyristor 109 through the diode 110 so that the thyristor 109 is conducted. Therefore both the xenon lamps 107 and 108 start to flash. Since the constant current circuit 103 supplies a predetermined steady current and the impedance is doubled in the discharge circuit because the xenon lamps 107 and 108 are connected in series, the flash lamps 107 and 108 may flash by a small current supplied and controlled by the constant current circuit 103. Since the current applied to the flash lamps 107 and 108 is small as compared with that supplied to the conventional xenon lamp, the intensity of flash of light is low, but the triggering current for flashing the flash lamps 107 and 108 is low, the triggering current is made constant by the constant current circuit 103, and the electrical energy consumed by the main flash capacitor 102 is less, a substantial part of the charge on the main flash capacitor 102 remains. The state of the monostable multivibrator 105 is reversed after a predetermined time interval so that a trigger pulse is applied to the gate electrode $116_1$ of the discharge lamp 116. The discharge lamp 116 starts discharge and its internal impedance is reduced so that the charge stored on the capacitor 113 is applied to the cathode of the thyristor 109 through the discharge lamp 116. As a result the thyristor 109 is cut off so that the flash lamps 107 and 108 are turned off. In summary, whenever the synchronous signal is applied to the input terminal $106_1$, the flash lamps 107 and 108 flash for a predetermined time which is determined by the monostable multivibrator 105, and then are turned off.

The electrical energy required for having the xenon lamps 107 and 108 flashed is very small because the current is limited by the lamps connected in series and the constant current circuit 103, so that the flash may be cycled.

Instead of the monostable multivibrator 105, an astable multivibrator may be used, and the flash characteristic curves are shown in FIG. 9 when an astable multivibrator is used.

Figure 11:
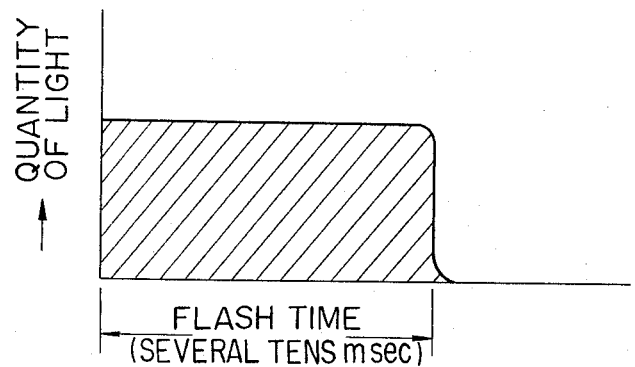
FIG. 11 is a graph illustrating the characteristics by a variation of the fourth embodiment shown in FIG. 8.

By selecting a large time constant of the monostable multivibrator 105, the flash duration may be increased to the order of tens micro seconds by the charge stored on the main flash capacitor 102 as indicated in FIG. 11.

Figure 10:
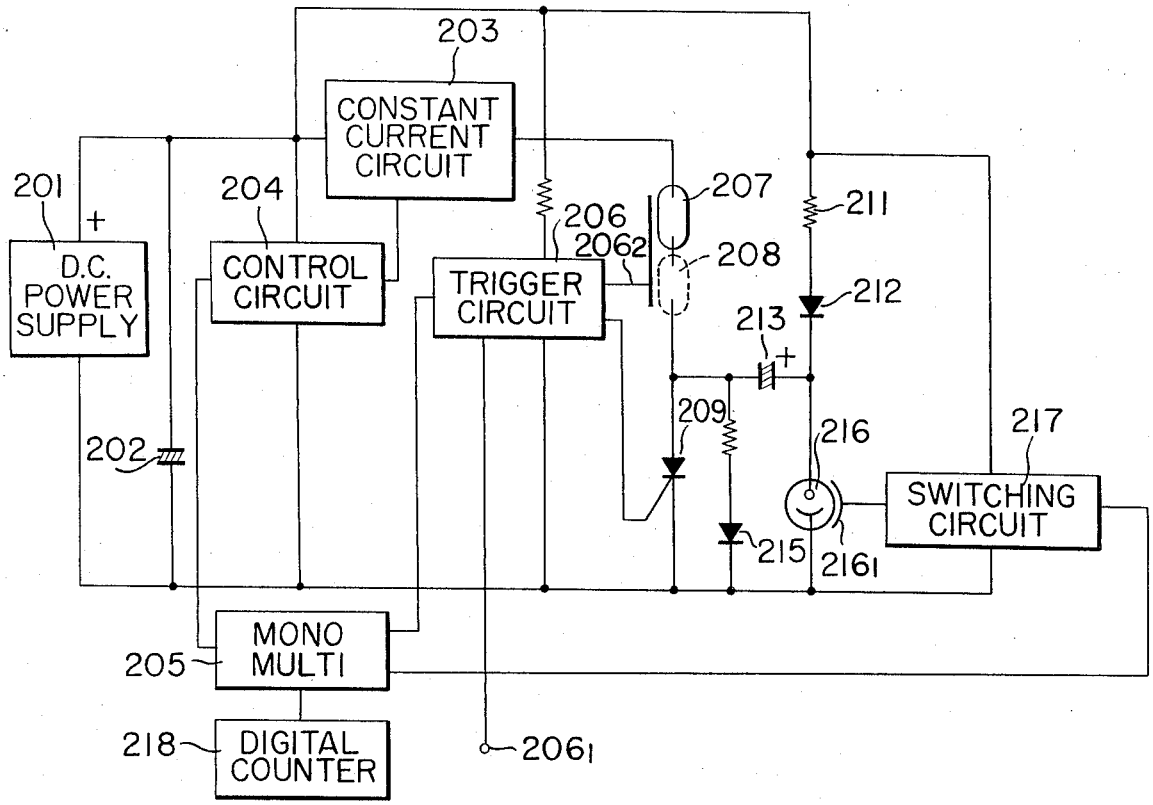
FIG. 10 is a circuit diagram of a fifth embodiment of the present invention.

Fifth Embodiment, FIG. 10

The fifth embodiment shown in FIG. 10 is substantially similar to the fourth embodiment described above with reference to FIG. 8 except that instead of the thyristor 109 a silicon controlled rectifier (SCR) 219 is used, and the component parts similar to those in the fourth embodiment shown in FIG. 8 are designated by the reference numerals used in FIG. 8 plus 100. For example, the DC power supply which is indicated by 101 in FIG. 8 is indicated by 201 in FIG. 10.

The digital counter 218 counts the number of transistions of the monostable multivibrator 205, that is the number of flashes, and the content of the digital counter 218 is converted into the analog voltage signal by a digital-to-analog converter to be applied to the input terminal of the constant current circuit 203. The number of flashes which are possible by one charging of the main flash capacitor 202 is approximately determined by the capacitance of the main flash capacitor 202 and the electrical energy consumed by the flash lamps 207 and 208. Therefore the counter 218 applies the stop signal as shown by the broken lines in FIG. 8 to the multivibrator 205, thereby stopping the operation thereof.

In the fourth and fifth embodiments, two flash lamps are used, but it will be understood that three flash lamps connected in series may be used so that the flash duration may increased at the sacrifice of the decrease in intensity of flash.

As described above according to the present invention the constant current is made to flow through the flash lamp or lamps so that the intensity of flash may be maintained constant. Therefore the flash unit in accordance with the present invention may be used with a camera with a focal plane shutter at a high speed or may be used in automatic flash photography by varying the constant current flowing through the flash lamp or lamps depending upon the distance to the subject. When the flash unit in accordance with the present invention is used in the stroboscopic unit with a flashmeter, the control of the intensity of flash may be easily attained.

Furthermore the present invention provides a flash unit which may maintain the intensity of flash of light for a relatively long time or may repeat the flashes with the same intensity at a predetermined frequency by applying a constant low current from a relatively small-capacity DC power supply through a constant current circuit to a plurality of series-connected flash lamps.

We claim:
1. A flash unit for cameras comprising
   a. a DC power supply for supplying a high DC voltage,
   b. at least one flash lamp provided with an auxiliary or trigger electrode arranged in circuit for application of a trigger pulse thereto and an anode and a cathode arranged in circuit for application of a discharge current thereto, and
   c. a constant current circuit means interconnected in series between said DC power supply and said at least one flash lamp for maintaining the current supplied from said DC power supply to said at least one flash lamp at a constant level for a period of time after application of a triggering pulse as aforesaid.

2. A flash unit as defined in claim 1 wherein said constant current circuit means comprises a Darlington circuit comprising at least two transistors, and a bias circuit for applying a predetermined current to said Darlington circuit.

3. A flash unit as defined in claim 1 wherein said constant current circuit means comprises a switching circuit means and transistor means arranged to be turned on or off by said switching circuit means in such a manner as to give a constant current output, the input of said transistor means being connected to said switching circuit.

4. A flash unit as defined in claim 1 wherein at least two series-connected flash lamps are arranged in such a manner that an anode of one of said at least two flash lamps and a cathode of the other flash lamp are connected to said DC power supply through said constant current circuit means, and the trigger signal is applied simultaneously to the parallel-connected trigger electrodes of said at least two flash lamps.

5. A flash unit as defined in claim 3 wherein said constant current circuit further comprises variable resistive means adjustable, means for varying said resistive means in accordance with the distance from the camera to the subject, a time constant circuit comprising said variable resistor means, and a capacitor one terminal of which is connected to said switching circuit.

6. A flash unit as defined in claim 3 wherein said switching means comprises
   a. a time constant circuit comprising a photoconductive cell means and a capacitor, and a first switching circuit having its output connected to the input of said time constant circuit;
   b. short-circuiting switch means connected in parallel with said capacitor in said time constant circuit and arranged to be opened when the shutter of the camera is opened, and electromagnet means connected to the output of said first switching circuit for closing the shutter.

7. A flash unit for cameras comprising
   a. power supply means for generating high-voltage DC current,
   said power supply means comprising a step-up circuit, and a main capacitor connected to the output of said step-up circuit;
   b. at least one flash lamp provided with an auxiliary or trigger electrode arranged in circuit for application of a trigger signal and an anode and a cathode arranged in circuit for application of a discharge current;
   c. a constant current circuit means interconnected between said power supply means and said at least one flash lamp so that a constant current may be supplied to said at least one flash lamp from said power supply means;
   d. switching means inserted in the discharge circuit of said at least one flash lamp and provided with a switching input arranged to receive the trigger signal pulse whenever such a signal is applied to said trigger electrode of said at least one flash lamp; and e. flash interruption means comprising a discharge switching circuit connected in parallel with said main capacitor so that the flash produced by said at least one flash lamp may be interrupted under control of said discharge switching circuit.

8. A flash unit as defined in claim 7 wherein said flash interruption means comprises
   a quenching tube connected in parallel with said main capacitor and provided with an anode, a cathode and a trigger electrode,
   a commutation capacitor interconnected between said anode of said quenching tube and the input of said switching means, and an interruption signal generating circuit for generating the interruption signal to said trigger electrode of said quenching tube.

9. A flash unit as defined in claim 7, wherein said switching means is a thyristor.

10. A flash unit as defined in claim 7, wherein said flash interruption means comprises a pulse oscillator circuit an output of which is connected to an input of said switching means to continually interrupt said switching means.

11. A flash unit as defined in claim 10, wherein said pulse oscillator circuit is an astable multivibrator.

12. A flash unit as defined in claim 10, wherein said pulse oscillator circuit is a monostable multivibrator.

13. A flash unit for cameras comprising:
a first DC power supply having a capacitor for storage electrical energy for flashing;
at least one triple-electrode discharge lamp comprising an auxiliary electrode for flash triggering, an anode arranged to be supplied with a discharge current from said first DC power supply, an auxiliary anode and a cathode;
a second DC power supply having a capacitor for storing electrical energy for auxiliary flashing, the voltage of said second power supply being set to a value higher than a lower limit of flashing of said discharge lamp, and the outputs of said second power supply being connected across said auxiliary electrode and said cathode; and
a constant current circuit interconnected in series between said first DC power supply and said at least one flash lamp for maintaining the current supplied from said first DC power supply to said at least one flash lamp at a constant level after flash triggering.

14. A flash unit for cameras comprising:
a DC power supply for supplying a high DC voltage;

at least one flash lamp provided with an auxiliary or trigger electrode arranged for application thereto of a trigger pulse and an anode and a cathode arranged for application thereto of a discharge current; and a constant current circuit serially connected between said DC power supply and said flash lamp for maintaining the current at a constant level for a period after application of a trigger pulse as aforesaid, said circuit comprising a variable resistance means for setting the magnitude of said discharge current supplied from said DC power supply at a predetermined level, said variable resistance means being so connected in said constant current circuit that at most a very small portion of said discharge current passes through said variable resistance means.

* * * * *